US009735722B2

(12) United States Patent
Marohl et al.

(10) Patent No.: US 9,735,722 B2
(45) Date of Patent: Aug. 15, 2017

(54) METHODS OF CONTROLLING A MACHINE USING A TORQUE COMMAND LIMIT DERIVED FROM A CURRENT LIMIT AND SYSTEMS THEREOF

(71) Applicants: Whitney M. Marohl, Moline, IL (US); Long Wu, Fargo, ND (US); Anthony Weber, Moline, IL (US)

(72) Inventors: Whitney M. Marohl, Moline, IL (US); Long Wu, Fargo, ND (US); Anthony Weber, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 145 days.

(21) Appl. No.: 14/183,655

(22) Filed: Feb. 19, 2014

(65) Prior Publication Data

US 2015/0236632 A1    Aug. 20, 2015

(51) Int. Cl.
| | |
|---|---|
| H02P 1/46 | (2006.01) |
| H02P 1/50 | (2006.01) |
| H02P 3/18 | (2006.01) |
| H02P 6/00 | (2016.01) |
| H02P 23/00 | (2016.01) |
| H02P 25/00 | (2006.01) |
| H02P 27/00 | (2006.01) |
| H02P 23/14 | (2006.01) |
| H02P 21/22 | (2016.01) |

(Continued)

(52) U.S. Cl.
CPC .............. *H02P 23/14* (2013.01); *H02P 21/22* (2016.02); *H02P 23/0077* (2013.01); *H02P 29/662* (2016.11); *H02P 25/022* (2013.01); *Y02T 10/7005* (2013.01); *Y02T 10/7258* (2013.01)

(58) Field of Classification Search
CPC ...... H02P 25/021; H02P 25/022; H02P 27/06; Y02T 10/7005; B60L 11/1803
USPC .......................................................... 318/722
See application file for complete search history.

(56) References Cited

U.S. PATENT DOCUMENTS

| | | | |
|---|---|---|---|
| 7,586,286 B2 * | 9/2009 | Cheng et al. ................. | 318/807 |
| 7,880,416 B2 * | 2/2011 | Schulz ..................... | H02P 6/08 |
| | | | 318/400.15 |
| 8,552,673 B2 | 10/2013 | Wu et al. | |

(Continued)

FOREIGN PATENT DOCUMENTS

WO    WO-2012136212 A2    10/2012

OTHER PUBLICATIONS

International Search Report and Written Opinion dated May 20, 2015.

*Primary Examiner* — Kawing Chan
*Assistant Examiner* — Bradley Brown
(74) *Attorney, Agent, or Firm* — Harness, Dickey & Pierce, P.L.C.

(57) ABSTRACT

At least one example embodiment discloses a method of controlling an alternating current (ac) machine. The method includes determining or retrieving a current limit for the ac machine, determining a characterized peak current value based on a voltage-to-speed ratio of the ac machine, determining current command values for the ac machine based on at least one of the torque command limit and a torque command for the ac machine, determining current command values for the ac machine based on the torque command limit and controlling the ac machine based on the current command values.

18 Claims, 7 Drawing Sheets

(51) Int. Cl.
*H02P 29/66* (2016.01)
*H02P 25/022* (2016.01)

(56) References Cited

U.S. PATENT DOCUMENTS

| | | | |
|---|---|---|---|
| 2007/0013333 A1* | 1/2007 | Ajima et al. | 318/432 |
| 2008/0121443 A1* | 5/2008 | Clark | B60L 3/108 180/65.1 |
| 2012/0056569 A1* | 3/2012 | Takamatsu et al. | 318/400.26 |
| 2012/0221280 A1* | 8/2012 | Wu | H02P 21/22 702/113 |
| 2014/0361717 A1 | 12/2014 | Schulz | |

* cited by examiner

METHODS OF CONTROLLING A MACHINE USING A TORQUE COMMAND LIMIT DERIVED FROM A CURRENT LIMIT AND SYSTEMS THEREOF

FIELD

Example embodiments are related to electric drive device systems and/or methods for controlling electric drive devices such as Interior Permanent Magnet (IPM) motors or machines.

BACKGROUND

Alternating current (ac) machines (e.g., IPM machines) are extensively used in loaders, combines or other heavy equipment machinery vehicle electric drive because they provide a higher efficiency than direct current (dc) machines. Of the ac machines, an Interior Permanent Magnet (IPM) machine has high drive efficiency and a wider constant power operating range. An IPM machine controller also called an inverter, controls operation of the IPM machine. The controller produces ac control signals which are applied to the terminals of the IPM machine.

In an IPM machine, a current limiting feature may be enabled such as stall current limiting and peak power. For example, a peak power feature may enable an inverter supply overload current to the machine. An overload current occurs when a current command is greater than a continuous rating of the machine.

If the peak power feature is enabled, the inverter monitors and protects the inverter during overloads. Failure to protect the inverter may result in damage to inverter components such as current sensors, DC bus capacitors and bus bars. An overload condition limit is defined along with an amount of time which overload current is allowed. The frequency for which repetitive overload conditions are allowed may also be defined. Once the inverter supplies overload current for a duration, the inverter current may then be limited for the remainder of a cycle.

SUMMARY

Some embodiments are directed to methods and apparatuses for controlling an AC machine such as an IPM machine through estimating the actual inverter or machine terminal voltage and torque.

At least one example embodiment discloses a method of controlling an alternating current (ac) machine. The method includes determining or retrieving a current limit for the ac machine, determining a characterized peak current value based on a voltage-to-speed ratio of the ac machine, determining a torque command limit based on the characterized peak current value and the current limit, determining current command values for the ac machine based on at least one of the torque command limit and a torque command for the ac machine and controlling the ac machine based on the current command values.

BRIEF DESCRIPTION OF THE DRAWINGS

Example embodiments will be more clearly understood from the following detailed description taken in conjunction with the accompanying drawings.

FIG. 1 illustrates a block diagram of FIGS. 1A-1B;

FIG. 2 is a block diagram of an electronic data processing system consistent with FIGS. 1A-1B, according to an example embodiment;

FIG. 3 illustrates an output current relative to a continuous current rating and a maximum current for an inverter;

FIG. 4 illustrates an example embodiment of the dq-axis current generation manager; and FIG. 5 illustrates a method of controlling an alternating current (ac) machine according to an example embodiment.

DETAILED DESCRIPTION

Figure 1:
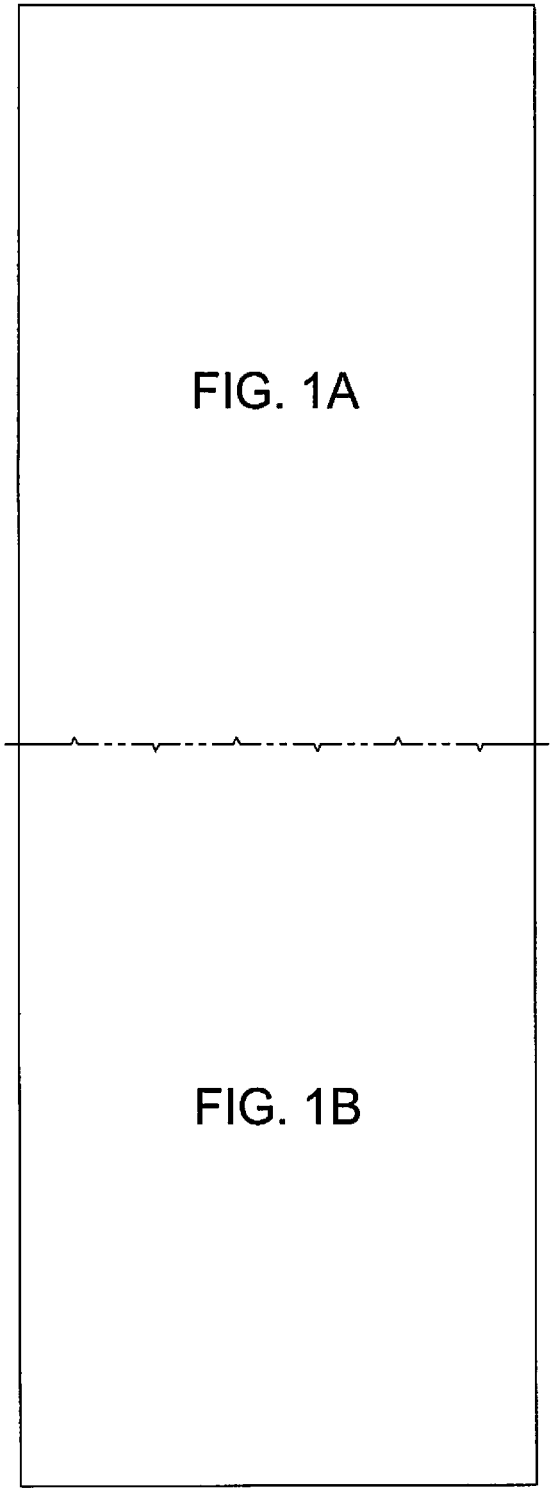
FIGS. 1-5 represent non-limiting, example embodiments as described herein.
Figure 1:
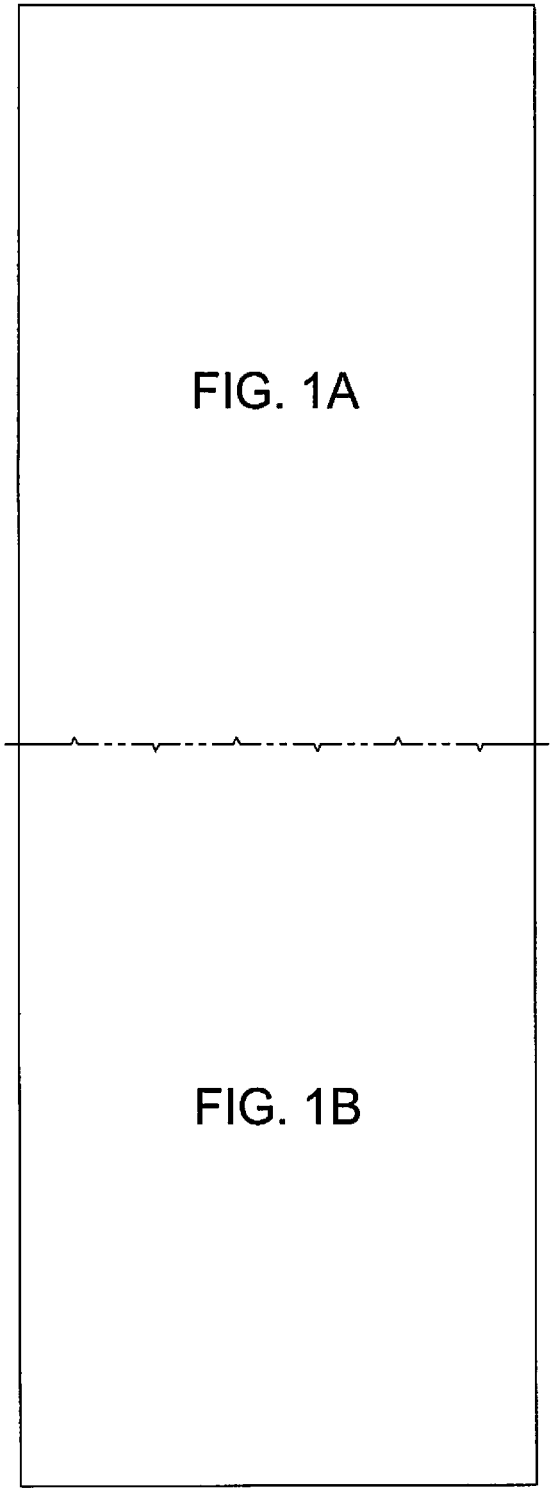

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

At least one example embodiment discloses a method of controlling an alternating current (ac) machine. The method includes determining or retrieving a current limit for the ac machine, determining a characterized peak current value based on a voltage-to-speed ratio of the ac machine, determining a torque command limit based on the characterized peak current value and the current limit, determining current command values for the ac machine based on at least one of the torque command limit and a torque command for the ac machine and controlling the ac machine based on the current command values.

In an example embodiment, the method further includes obtaining the torque command for the ac machine, determining a torque command percentage based on the torque command and determining a minimum of the torque command percentage consistent with the torque command limit, the current command values being based on the minimum.

In an example embodiment, the method further includes determining a current magnitude percentage based on the current limit and the characterized peak current value, wherein the determining the torque command limit is based on the current magnitude percentage.

In an example embodiment, the determining or retrieving the torque command limit includes determining an operating mode of the ac machine, the operating mode being one of a braking mode and a motoring mode and selecting a torque command limit table associated with the operating mode, the torque command limit table including torque command limit values corresponding to voltage-to-speed ratios and current magnitude percentages, respectively, the torque command limit table including the determined torque command limit.

In an example embodiment, the determining or retrieving the torque command limit includes generating a final torque command limit by limiting a rate of change between the determined torque command limit and a previous torque command limit, the current command values being based on the final torque command limit.

In an example embodiment, the current command values are direct and quadrature axis values.

In an example embodiment, the determining current command values determines the current command values further based on the voltage-to-speed ratio and operating mode of the ac machine.

In an example embodiment, the torque command limit is a percentage.

In an example embodiment, the current command values are direct and quadrature axis values.

At least one example embodiment discloses a system including a processor configured to determine or retrieve a current limit for the ac machine, determine a characterized peak current value based on a voltage-to-speed ratio of the ac machine, determine a torque command limit based on the characterized peak current value and the current limit and determine current command values for the ac machine based on at least one of the torque command limit and a torque command for the ac machine.

In an example embodiment, the processor is configured to obtain a torque command for the ac machine, determine a torque command percentage based on the torque command and determine a minimum of the torque command percentage consistent with the torque command limit, the current command values being based on the minimum.

In an example embodiment, the processor is configured to determine a current magnitude percentage based on the current limit and the characterized peak current value, wherein the determining the torque command limit is based on the current magnitude percentage.

In an example embodiment, the processor is configured to determine an operating mode of the ac machine, the operating mode being one of a braking mode and a motoring mode and select a torque command limit table associated with the operating mode, the torque command limit table including torque command limit values corresponding to voltage-to-speed ratios and current magnitude percentages, respectively, the torque command limit table including the determined torque command limit.

In an example embodiment, the processor is configured to generate a final torque command limit by limiting a rate of change between the determined torque command limit and a previous torque command limit, the current command values being based on the final torque command limit.

In an example embodiment, the current command values are direct and quadrature axis values.

In an example embodiment, the processor is configured to determine the current command values further based on the voltage-to-speed ratio and operating mode of the ac machine.

In an example embodiment, the torque command limit is a percentage.

In an example embodiment, the current command values are direct and quadrature axis values.

Figure 1A:
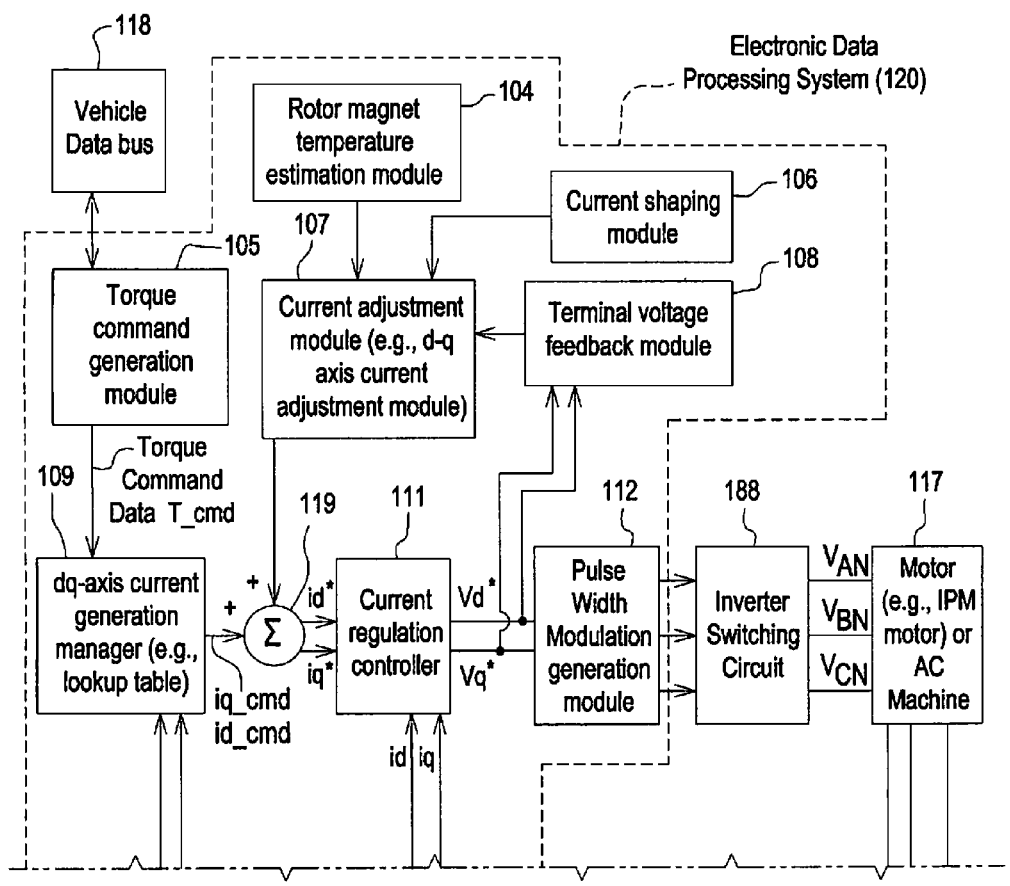
FIGS. 1A-1B is a block diagram of a system for controlling an electrical motor, according to an example embodiment.
Figure 1B:
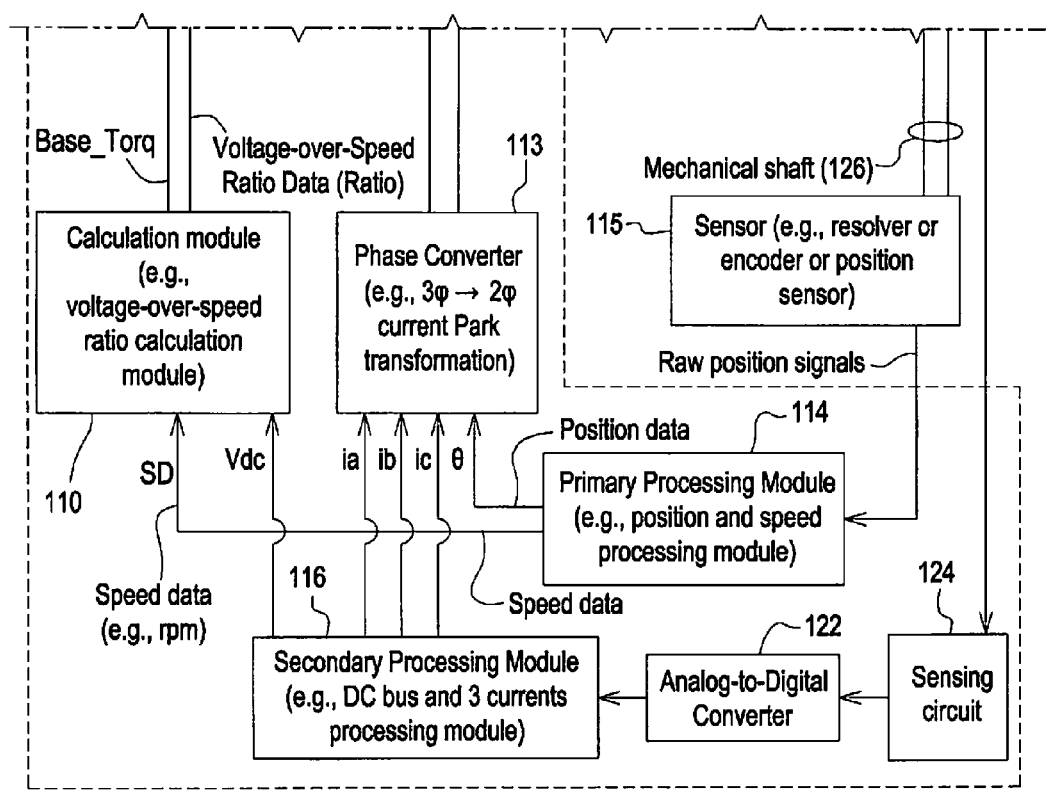

In accordance with an example embodiment, FIGS. 1A-1B illustrates a drive system 100 for controlling a machine such as an electric motor. The electrical motor may be a motor such as a motor 117 (e.g., an interior permanent magnet (IPM) motor) or another alternating current machine. The motor 117 has a nominal dc bus voltage (e.g., 320 Volts). The nominal voltage is a named voltage. For example, a nominal voltage of the motor 117 may be 320 Volts, but the motor may operate at a voltage above and below 320 Volts. In an example embodiment, the system, aside from the motor 117, may be referred to as an inverter or a motor controller. The system for controlling the motor 117 may also be referred to as a machine system.

It should be understood that the drive system 100 may include additional features that are not illustrated in FIG. 1A. The features shown in FIGS. 1A-1B are illustrated for the convenience of describing the drive system 100 and it should be understood that the drive system 100 should not be limited to the features shown in FIGS. 1A-1B.

The system 100 includes electronic modules, software modules, or both. In an example embodiment, the drive system 100 includes an electronic data processing system 120 to support storing, processing or execution of software instructions of one or more software modules. The electronic data processing system 120 is indicated by the dashed lines in FIG. 1A-1B and is shown in greater detail in FIG. 2. The electronic data processing system 120 may also be referred to as a controller and/or processor for the motor 117. The data processing system 120 is configured to determine a current limit for the ac machine, determine a characterized peak current value based on a voltage-to-speed ratio of the ac machine, determine a torque command limit based on the characterized peak current value and the current limit and determine current command values for the ac machine based on the torque command limit.

The data processing system 120 is coupled to an inverter circuit 188. The inverter circuit 188 may be a three-phase inverter. The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117.

In an example embodiment, a torque command generation module 105 is coupled to a torque compensation module, which is coupled to a d-q axis current generation manager 109 (e.g., d-q axis current generation look-up tables). The d-q axis current, which is in a rotating reference frame, refers to the direct axis current and the quadrature axis current as applicable in the context of vector-controlled alternating current machines, such as the motor 117.

The output of the d-q axis current generation manager 109 (d-q axis current commands iq_cmd and id_cmd) and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective final d-q axis current commands (e.g., id* and iq*) and actual d-q axis currents (e.g., id and iq) and outputs corresponding d-q axis voltage commands (e.g., Vd* and Vq* commands) for input to the PWM generation module 112.

In an example embodiment, the PWM generation module 112 provides pulse commands for control of the inverter circuit 188. Outputs of the PWM generation module 112 are coupled to an inverter circuit 188. The output stage of the inverter circuit 188 (e.g., output present phase voltages $V_{AN}$, $V_{BN}$ and $V_{CN}$) provides a pulse-width modulated voltage waveform or other voltage signal for control of the motor 117. The voltages $V_{AN}$, $V_{BN}$ and $V_{CN}$ may be referred to as phase voltages, current control step voltages or present control step voltages, for example. In an example embodiment, the inverter circuit 188 is powered by a direct current (dc) voltage bus.

The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to a calculation module 110 (e.g., voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and is from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The calculation module 110 generates a base torque value based on the speed data and dc bus voltage. Base torque values are respectively associated with discrete speed points with a nominal dc bus voltage level. In other words, calculation module 110 may be a two-dimensional base torque LUT that is established from a motor characterization procedure. During the IPM motor characterization procedure, each rotor shaft speed has a maximum output torque, which is defined as the base torque at that speed. Thus, the base torque may also be referred to as peak torque if the dc bus is at a nominal voltage. The base torque is a maximum achievable torque for a voltage and speed combination. An example of IPM motor characterization is described in U.S. application Ser. No. 13/036,286, filed Feb. 28, 2011, the entire contents of which are incorporated herein by reference.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In an example embodiment, the system may operate in the following manner. The torque command generation module 105 receives an input control data message, such as a speed control data message, a voltage control data message, or a torque control data message, over a vehicle data bus 118. The torque command generation module 105 converts the received input control message into raw torque control command data $T_{cmd}$.

The d-q axis current generation manager 109 selects or determines the direct axis current command and the quadrature axis current command associated with respective final torque control command data $T_{cmd}$, base torque command data Base_Torq and the voltage-over-speed ratio.

For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: the preliminary adjustment, the secondary adjustment, and the third adjustment.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another configuration, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
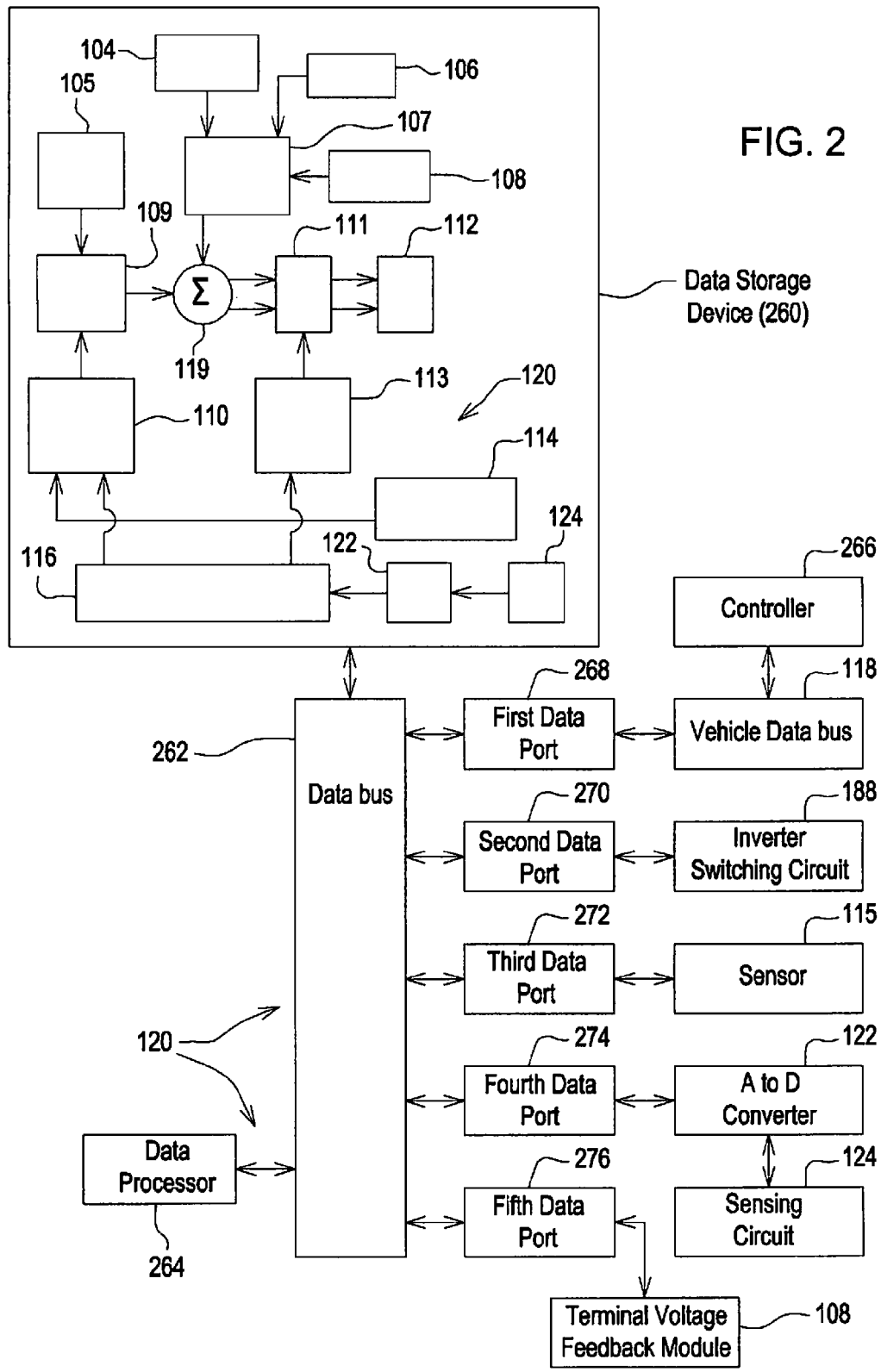

FIG. 2 is a block diagram of an electronic data processing system consistent with FIGS. 1A-1B, according to an example embodiment. In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control devices.

In some example embodiments, the sensor 115 and the primary processing module 114 may be associated with or supported by a third data port 272 of the data processing system 120.

The data processor 264 may be specifically programmed to execute the rotor magnet temperature estimation module 104, the torque command generation module 105, the current shaping module 106, the current adjustment module 107, the terminal voltage feedback module 108, the dq-axis current generation manager 109, the calculation module 110, the current regulation controller 111, the PWM generation module 112, the phase converter 113, the primary processing module 114, the secondary processing module 116, the summer 119, the ADC 122, the sensing circuit 124, the machine terminal voltage estimation module 127, the torque estimation module 129 and the torque compensation module 131.

Figure 3:
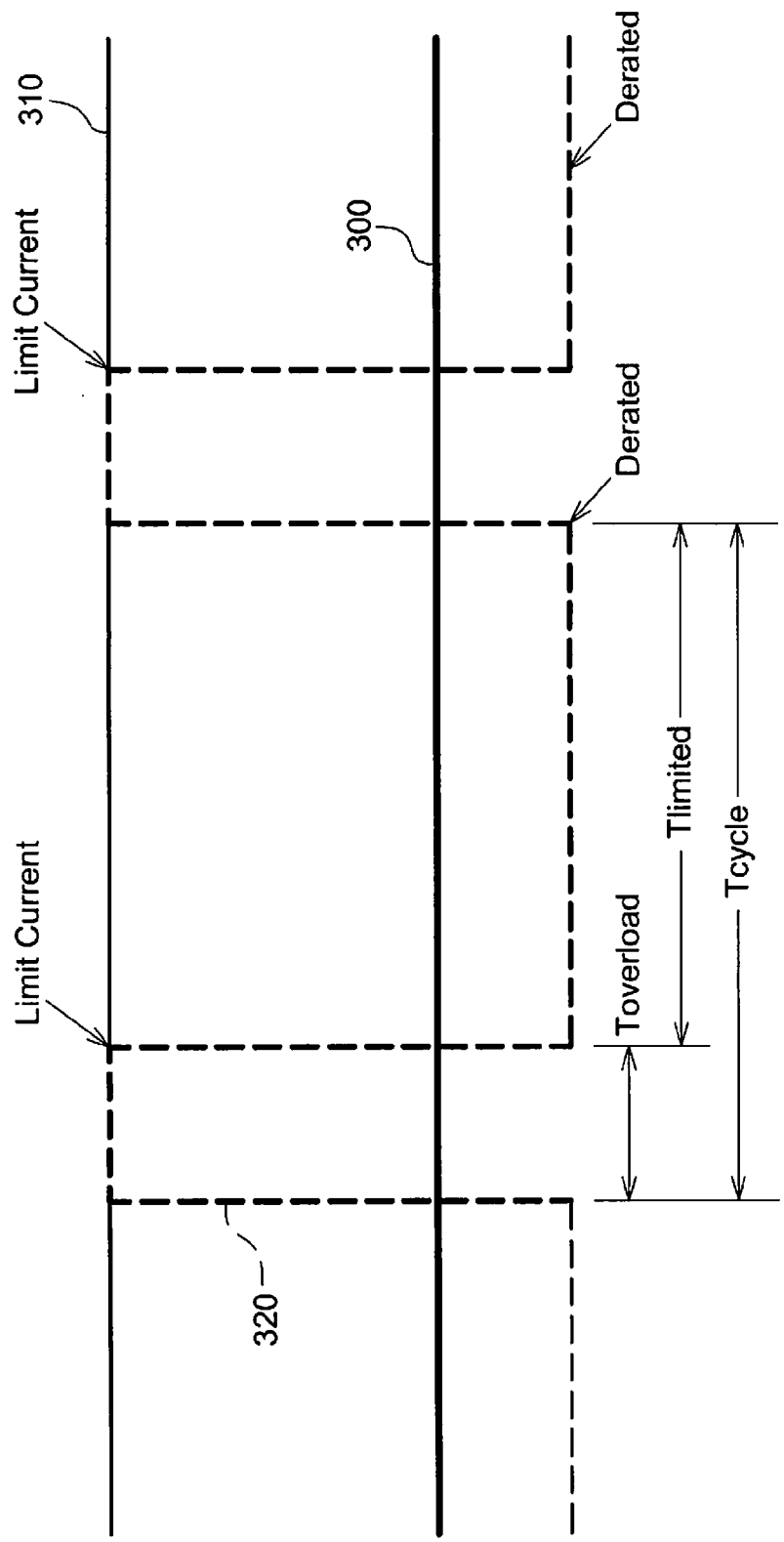

FIG. 3 illustrates an output current relative to a continuous current rating and a maximum current for the inverter 188. As shown in FIG. 3, the inverter 188 has a continuous current rating of 300 and a maximum current of 310. A continuous current rating may be implemented based on a machine fundamental frequency and motor characterization data and stored in the storage device 260. For example, a lookup table may be implemented for the processing system 120 to select the continuous current based on the machine fundamental frequency. Similarly, the maximum current may be determined from the characterization data.

A peak power feature may have a cycle duration of Tcycle. To protect and monitor the inverter 188 while the peak power feature is enabled, an $I^2t$ (squared value of stator current space vector (current magnitude) multiplied by execution rate of the processing system 120) algorithm is implemented. During a peak power (current overload) condition, the output current 320 is at the maximum current 310 and an accumulated I²t value is monitored for set period of time Toverload. When the set period of time Toverload is reached, the final accumulated I²t is recorded. Then for the remainder of the peak power repetitive overload cycle, Tlimited, the inverter output current 320 is be limited below the continuous current rating until the accumulated I²t value decreases back to zero. This permits a current overload for a short defined period while the total rms current over a defined cycle is limited to the continuous current. In an example, Toverload may be one minute, Tlimited may be fourteen minutes and Tcycle may be fifteen minutes.

Figure 4:
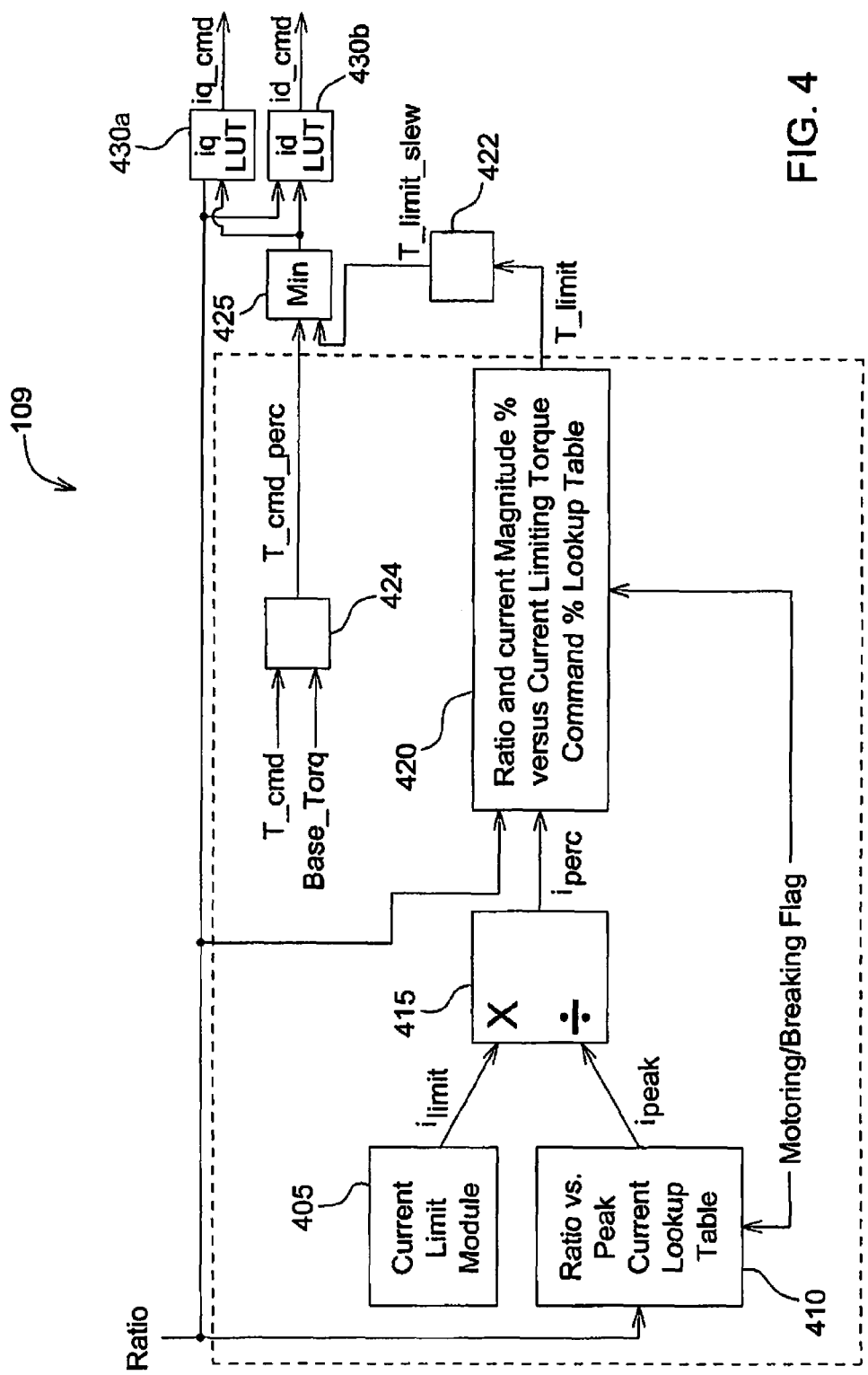

FIG. 4 illustrates an example embodiment of the dq-axis current generation manager 109. The dq-axis current generation manager is configured to convert a current limit into a torque percent limit. The dq-axis current generation manager 109 can be used where the ratio and torque command percentage are used in a lookup to select the proper current commands. This will reduce DSP memory usage as the same current command lookup tables 430 can be used. Moreover, the characterized current commands will be selected from $i_d$, $i_q$ lookup tables that are generated during motor characterization.

As shown, the dq-axis current generation manager 109 includes a current limit module 405, ratio vs. peak current lookup table 410, dividers 415 and 424, ratio and current magnitude percentage versus current limiting torque command percentage lookup table 420, a slew module 422, a selector 425 and an $i_d$, $i_q$ lookup tables 430a, 430b.

The lookup tables 410, 420 and 430 may be generated from the characterization procedure. In an IPM characterization procedure, machine efficiency data corresponding to each torque command percentage and voltage-speed ratio combination are available. Similar to the dq-axis current lookup table, an efficiency lookup table is also created from characterization, which also uses ratio and torque command percentage as inputs. Considering the efficiency table and current lookup tables have the same inputs, the efficiency lookup table is connected in parallel with the $i_d$ and $i_q$ lookup tables to share the same inputs. In the case of separate motoring and braking characterization, there are two different efficiency lookup tables for motoring and braking modes. Maximum torque per amp (MTPA) and maximum torque per volt (MTPV) curves are recorded for several different machine speeds during the characterization procedure.

The current limit module 405 produces a current limit based on the ratio. For example, determining the current limit may be done once during a motor characterization phase. Accordingly, the current limit $i_{limit}$ could be a setting that is programmed into the data storage device 260 or nonvolatile electronic memory of the controller 266 and then retrieved after characterization. In another example embodiment, the inverter 188 or controller 266 has a list of motor model numbers and manufacturers and that the inverter 188 is programmed in a set-up phase to use the proper corresponding current limit $i_{limit}$ from a look-up table, database, file or other record that contains motor model numbers and corresponding current limits. In another example embodiment, a plug-and-play setup may identify the motor's properties (including current limit) with an RF ID tag or another identifier or by virtue of a similar RF ID tag installed on the chassis or other portion of a vehicle.

The current limit module 405 may generate the current limit $i_{limit}$ based on a wide range of functional blocks such as peak power, overloading, or stall current protection.

In one example embodiment, the current limit module 405 implements the I²t algorithm described in FIG. 3.

More specifically, incremental I²t value can be calculated by the current limit module 405 from the following equation.

$$[I^2]T_{incremental} = [I_{cmd}^2 - I_{cont}^2]T \quad (1)$$

where $I_{cmd}$ is the magnitude of the d-axis current command squared plus the q-axis current command squared, $I_{cont}$ is the continuous current rating, and T is the rate at which the I²t module is executed.

During an overload condition, $I^2_{cmd}$ is greater than $I^2_{cont}$ yielding a positive incremental I²t value. Upon the first instant that the incremental I²t value becomes positive an overload timer is activated by the current limit module 405. During the overload period Toverload, each positive incremental value is summed by the current limit module 405 to obtain an accumulated I²t value. The current limit for the overload remains equal to the characterized peak current which is derived from a characterized peak torque from motor characterization. The following equation is used by the current limit module 405 to obtain the accumulated I²t value, when Toverload is a one minute.

$$[I^2_{accum}]T = \sum_{t=0\,sec}^{t=1\,min} I^2 T_{incemental}, \text{ if } I^2 T_{incemental} > 0 \quad (2)$$

After Toverload is complete, the accumulated I²t value is recorded by the current limit module 405. Next, the current limit module 405 activates a countdown timer the duration of Tlimited and calculates a de-rated current limit. The de-rated current limit calculation will limit the inverter output current below the continuous current rating for Tlimited, and the accumulated I²t value will be reduced back to zero.

During Tlimited, the current limit module 405 implements a de-rated current limit $I_{de-rated}$ as the current limit $i_{limit}$ so a total rms current over Tcycle is limited to the continuous current rating. The current limit module 405 uses the following equation to determine the de-rated current limit $I_{de-rated}$ $$I_{de-rated} = \sqrt{\frac{-[I^2_{accum}]T}{(T_{cycle} - T_{overload})} + I^2_{count}} \quad (3)$$

Once the countdown timer is complete, the current limit module sets the current limit $i_{limit}$ back to the continuous current rating.

When the peak power feature is enabled there are three different operational states. The three different states are non-limiting, non-limiting with incremental I²t calculation, and current limiting which may be identified as state 0, state 1, and state 2, respectively. Toverload may correspond to state 1, Tlimited may correspond to state 2 and an initial state may be described as state zero (when $I^2T_{incemental}$ is not positive). The table bellows illustrates the current limit $i_{limit}$ based on the state of the inverter 188.

TABLE 1

| Peak Power Enabled? | Operational State | State Name | Inverter Current Limit |
|---|---|---|---|
| No | 0 | Disabled | Continuous Current |
| Yes | | Non-limiting | Continuous Current |
| No | 1 | Non-limiting | Maximum Current |

TABLE 1-continued

| Peak Power Enabled? | Operational State | State Name | Inverter Current Limit |
|---|---|---|---|
| Yes | | incremental I²t | |
| No | 2 | Current Limiting | $I_{limited}$ (Equation 3) |
| Yes | | | |

While the above description refers to an I²t algorithm, it should be understood that example embodiments are not limited thereto.

As shown in FIG. 4, the dq-axis current generation manager 109 does not use the current limit $i_{limit}$ to directly modify the currents supplied to the inverter 188. Using the current limit $i_{limit}$ to directly modify the currents supplied to the inverter may compromise the performance of the motor 117 because the current commands may not be used from the maximum torque per amp (MTPA) and maximum torque per volt (MTPV) curves. Consequently, the dq-axis current generation manager 109 converts the current limit into a torque command limit T_limit. The torque command limit T_limit may be used as an input for the MTPA and MPTV lookup tables, enabling performance during current limiting conditions.

Referring back to FIG. 4, the ratio versus peak current lookup table 410 generates a peak current $i_{peak}$ (first current value) based on the ratio. The peak current $i_{peak}$ is the peak characterized current value (100% current). The ratio versus peak current lookup table 410 includes two lookup tables for determining the peak current $i_{peak}$. One lookup table is associated with a motoring operation and the other lookup table is associated with a braking operation. A motoring/braking indication flag may be used to determine whether to use the lookup table associated with the motoring operation or the lookup table is associated with the braking operation.

The ratio vs. peak current lookup tables for motoring and braking are generated by calculating the current magnitude from the maximum dq axis current values corresponding to 100% torque command at the voltage speed ratio points to construct a LUT to determine the $i_{peak}$ value.

The divider 415 receives the current limit $i_{limit}$ and the peak current $i_{peak}$ and generates a current magnitude percentage $i_{perc}$. The divider calculates the current magnitude percentage $i_{perc}$ as follows:

$$i_{perc} = 100 * \frac{i_{limit}}{i_{peak}} \quad (4)$$

The ratio and current magnitude percentage versus current limiting torque command percentage lookup table 420 uses the voltage-to-speed ratio and the current magnitude percentage $i_{perc}$ as inputs and generates a torque command limit T_limit from the inputs. The torque command limit T_limit may be a percentage.

The ratio and current magnitude percentage versus current limiting torque command percentage lookup table 420 includes two lookup tables for the torque command limit T_limit. One lookup table is used for motoring operation, and the second lookup table is for braking operation. Each lookup table in the ratio and current magnitude percentage versus current limiting torque command percentage lookup table 420 may have a single current limit percentage array in a left column and the associated torque command limits at various voltage-to-speeds ratios in the other columns. The motoring/braking indication flag may be used to select the lookup table. The torque command limit T_limit may be a current limiting torque command percentage.

The current limiting torque command percentage LUTs may be generated by transforming dq axis current commands into a current magnitude and dividing by the peak current $i_{peak}$ for the corresponding voltage speed ratio points, which creates a current magnitude percentage. The torque percentage limit lookup table may be created by interpolating between the current magnitude percentages.

A slew module 422 may be included to limit the rate of change of the torque command limit T_limit. The output of the slew module 422 produces a slewed torque command limit T_limit slewed, which may be the torque command limit T_limit if the rate of change is within a limit range. Consequently, the slew module 422 may ramp down/up the final torque command limit T_limit slewed to prevent an instantaneous large jump.

The divider 424 is configured to convert the absolute value of the torque command T_cmd into a torque command percentage T_cmd_perc of the base torque value Base_Torq. The divider 424 outputs the torque command percentage T_cmd_perc to the selector 425.

The selector 425 selects a minimum of the torque command percentage T_cmd_pct consistent with the final torque command limit T_limit_slew. With the addition of the peak power feature there are two final torque command percentages, T_cmd_perc and T_limit_slew. Therefore, during each control iteration (e.g., 500 μs), only one of the two final torque command percentages is selected by the selector 425. The selector 425 outputs the minimum of the torque command percentage T_cmd_pct consistent with the final torque command limit T_limit_slew to the $i_d$, $i_q$ lookup table 430.

The q-axis current command (iq) LUT 430a and the d-axis current command (id) LUT 430b are configured to receive the ratio and the output of the selector 425. The q-axis current command LUT 430a and the d-axis current command LUT 430b store q-axis and d-axis current commands, respectively, each of which is associated with a pair of ratio and torque percentage values. The development of the q-axis current command LUT 430a and the d-axis current command LUT 430b may be done using any known method.

The d-q axis current refers to the direct axis current and the quadrature axis current as applicable in the context of vector-controlled alternating current machines, such as the motor 117.

The d-axis current command LUT 430b is configured to output a d-axis current command $i_d$_cmd that is associated with the minimum of the torque command percentage T_cmd_pct consistent with the final torque command limit T_limit_slew and the ratio. As shown in FIG. 1A, the d-axis current command $i_d$_cmd is output to the current regulator 111.

The q-axis current command LUT 430a is configured to output a q-axis current command $i_q$_cmd that is associated with the minimum of the torque command percentage T_cmd_pct consistent with the final torque command limit T_limit_slew and the ratio.

It should be understood that $i_d$_cmd and $i_q$_cmd are current commands for a stator of the motor 117.

While the q-axis current command LUT 430a and d-axis current command LUT 430b are illustrated and described as LUTs, it should be understood that the q-axis current command LUT 430a and d-axis current command LUT 430b may be implemented as a set of equations that relate respective torque commands to corresponding direct and quadrature axes currents, or a set of rules (e.g., if-then rules)

that relates respective torque commands to corresponding direct and quadrature axes currents.

As described above, the dq-axis current generation manager 109 selects d-axis and q-axis current commands based on the voltage-to-speed ratio and the torque command limit percentage.

As discussed earlier, the modules/LUTs depicted in FIG. 4 may be executed/utilized by the system processor 120, shown in FIGS. 1A-1B, and implemented on a variety of hardware including, but not limited programmable logic devices such as a digital signal processor or FPGA. For example, the processor 264 may be programmed to execute the modules and to utilize the LUTs shown in FIG. 4.

Figure 5:
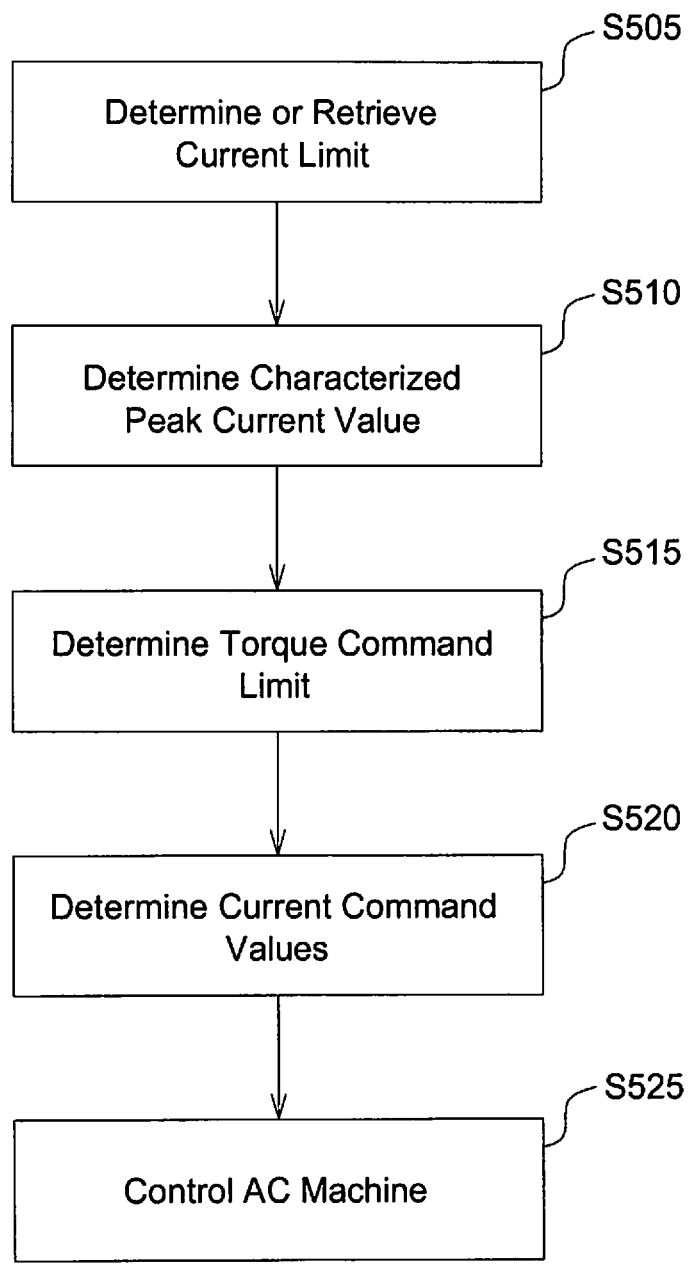

FIG. 5 illustrates a method of controlling an alternating current (ac) machine according to an example embodiment. The method of FIG. 5 may be performed by the processor 120 and, more specifically, the d-q axis current generation manager 109.

At S505, the d-q axis current generation manager 109 determines or retrieves a current limit. For example, determining the current limit may be done once during a motor characterization phase. Accordingly, the current limit could be a setting that is programmed into the data storage device 260 or nonvolatile electronic memory of the controller 266 and then retrieved after characterization. In another example embodiment, the inverter 188 or controller 266 has a list of motor model numbers and manufacturers and that the inverter 188 is programmed in a set-up phase to use the proper corresponding current limit from a look-up table, database, file or other record that contains motor model numbers and corresponding current limits. In another example embodiment, a plug-and-play setup may identify the motor's properties (including current limit) with an RF ID tag or another identifier or by virtue of a similar RF ID tag installed on the chassis or other portion of a vehicle.

At S510, the d-q axis current generation manager 109 determines a characterized peak current value based on a voltage-to-speed ratio of the ac machine. For example, the ratio versus peak current lookup table 410 generates peak current $i_{peak}$ based on the ratio.

At S515, the d-q axis current generation manager 109 determines a torque command limit based on the characterized peak current value and the current limit. For example, the LUT 420 may generate the torque command limit based on the peak current and the current limit. The slew module 422 may be included to limit the rate of change of the torque command limit. The output of the slew module 422 produces a slewed torque command limit, which may be the torque command limit if the rate of change is within a limit range.

At S520, the d-q axis current generation manager 109 determines current command values for the ac machine based on at least one of the torque command limit and a torque command for the ac machine. For example, the q-axis current command (iq) LUT 430*a* and the d-axis current command (id) LUT 430*b* are configured to receive the ratio and the output of the selector 425. The d-axis current command LUT 430*b* is configured to output a d-axis current command $i_d$_cmd that is associated with the minimum of the torque command percentage T_cmd_pct consistent with the final torque command limit T_limit_slew and the ratio.

At S525, the determined current command values are used to control the motor.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling an alternating current (ac) machine, the method comprising:
    determining or retrieving a current limit for the ac machine;
    determining a characterized peak current value based on a voltage-to-speed ratio of the ac machine;
    determining a current magnitude percentage based on the characterized peak current value and the current limit;
    determining a torque command limit using the current magnitude percentage and the voltage-to-speed ratio;
    determining current command values for the ac machine based on at least one of the torque command limit and a torque command for the ac machine; and
    controlling the ac machine based on the current command values.

2. The method of claim 1, further comprising:
    determining a torque command percentage based on the torque command for the ac machine; and
    determining a minimum of the torque command percentage consistent with the torque command limit, the current command values being based on the minimum.

3. The method of claim 1, wherein the determining or retrieving the torque command limit includes:
    determining an operating mode of the ac machine, the operating mode being one of a braking mode and a motoring mode; and
    selecting a torque command limit table associated with the operating mode, the torque command limit table including torque command limit values corresponding to voltage-to-speed ratios and current magnitude percentages, respectively, the torque command limit table including the determined torque command limit.

4. The method of claim 1, wherein the determining or retrieving the torque command limit includes,
    generating a final torque command limit by limiting a rate of change between the determined torque command limit and a previous torque command limit, the current command values being based on the final torque command limit.

5. The method of claim 4, wherein the current command values are direct and quadrature axis values.

6. The method of claim 1, wherein the determining current command values determines the current command values further based on the voltage-to-speed ratio and operating mode of the ac machine.

7. The method of claim 1, wherein the torque command limit is a percentage.

8. The method of claim 1, wherein the current command values are direct and quadrature axis values.

9. A system comprising:
    a processor configured to,
        determine or retrieve a current limit for the ac machine;
        determine a characterized peak current value based on a voltage-to-speed ratio of the ac machine;
        determine a current magnitude percentage based on the characterized peak current value and the current limit;
        determine a torque command limit using the current magnitude percentage and the voltage-to-speed ratio;
        determine current command values for the ac machine based on at least one of the torque command limit and a torque command for the ac machine; and
        control the ac machine based on the current command values.

10. The system of claim 9, wherein the processor is configured to,
determine a torque command percentage based on the torque command for the ac machine; and
determine a minimum of the torque command percentage consistent with the torque command limit, the current command values being based on the minimum.

11. The system of claim 9, wherein the processor is configured to,
determine an operating mode of the ac machine, the operating mode being one of a braking mode and a motoring mode; and
select a torque command limit table associated with the operating mode, the torque command limit table including torque command limit values corresponding to voltage-to-speed ratios and current magnitude percentages, respectively, the torque command limit table including the determined torque command limit.

12. The system of claim 9, wherein the processor is configured to,
generate a final torque command limit by limiting a rate of change between the determined torque command limit and a previous torque command limit, the current command values being based on the final torque command limit.

13. The system of claim 12, wherein the current command values are direct and quadrature axis values.

14. The system of claim 9, wherein the processor is configured to determine the current command values further based on the voltage-to-speed ratio and operating mode of the ac machine.

15. The system of claim 9, wherein the torque command limit is a percentage.

16. The system of claim 9, wherein the current command values are direct and quadrature axis values.

17. The method of claim 1, wherein the determining current command values determines the current command values using the torque command limit.

18. The system of claim 9, wherein the processor is configured to determine the current command values using the torque command limit.

* * * * *